United States Patent [19]

Corbin, Jr. et al.

[11] Patent Number: 4,589,790
[45] Date of Patent: May 20, 1986

[54] METHOD AND APPARATUS FOR CONTROLLING ESCAPEMENT

[75] Inventors: John S. Corbin, Jr.; Darryl R. Polk; Ciro N. Ramirez, all of Austin, Tex.

[73] Assignee: International Business Machines Corporation, Armonk, N.Y.

[21] Appl. No.: 614,628

[22] Filed: May 29, 1984

[51] Int. Cl.⁴ .............................................. B41J 19/50
[52] U.S. Cl. .................................. 400/322; 400/328; 400/903; 318/696
[58] Field of Search ............... 400/903, 320, 322, 328, 400/902; 318/685, 696

[56] References Cited

U.S. PATENT DOCUMENTS

| | | | |
|---|---|---|---|
| 4,091,316 | 5/1978 | Friedman | 318/685 |
| 4,147,967 | 4/1979 | Aiena | 318/341 |
| 4,156,105 | 5/1979 | Arene et al. | 101/93.19 |
| 4,215,302 | 7/1980 | Chiang | 318/696 |
| 4,254,371 | 3/1981 | Scholten | 318/685 |
| 4,258,622 | 3/1981 | Estraband et al. | 318/685 |
| 4,293,233 | 10/1981 | Hoffman | 400/144.2 |
| 4,318,625 | 3/1982 | Survant | 318/696 |

FOREIGN PATENT DOCUMENTS

DE28240-80A1 7/1978 Fed. Rep. of Germany .

OTHER PUBLICATIONS

Survant, "Compensation for Natural Frequency Variation", IBM Technical Disclosure Bulletin, vol. 22, No. 9, p. 4135, 2/80.

Kulterman, "Electrical Damping for . . . Motor", IBM Technical Disclosure Bulletin, vol. 21, No. 2, pp. 445-447, 7/78.

Primary Examiner—William Pieprz
Attorney, Agent, or Firm—J. F. Villella, Jr.

[57] ABSTRACT

A method and apparatus for minimizing escapement positioning error by matching the move sequence of a print carrier to the mechanical system dynamic characteristics without the use of a feedback sensor are described. A plurality of constant velocity signals are provided for driving the print carrier to the next print position. The sequential velocity signals comprise an acceleration velocity signal and a deceleration velocity signal, the duration of which are dependent upon the damped natural frequency of the print system. For long escapement moves, a slew velocity command is provided between the acceleration and deceleration velocity commands so as to maintain the velocity of the print carrier at the amplitude it had attained at the conclusion of the acceleration velocity signal. The relative amplitudes of the acceleration, slew and deceleration velocity signals are a function of the damping ratio of the printer system.

16 Claims, 13 Drawing Figures

METHOD AND APPARATUS FOR CONTROLLING ESCAPEMENT

TECHNICAL FIELD

This invention relates to a method and apparatus for minimizing escapement positioning error by matching the move sequence of a print carrier assembly to the mechanical system dynamic characteristics without the use of a feedback sensor.

BACKGROUND ART

As is well known, in a "print-stopped" machine a character is printed only after the print mechanism is brought to rest at the specified print location. The escapement control system which governs the move to the next print location must move the carrier and print head assembly to a controlled stop in such a manner than any position undershoot or overshoot is within specifications. Any position undershoot or overshoot directly contributes to character registration error thus decreasing print quality. Additionally, the time required to move the print carrier and print head assembly to a controlled stop critically affects the overall throughput of the printer. As a result, the escapement control system must minimize position undershoot and overshoot without compromising move time and hence printer throughput.

The undershoot and overshoot problem becomes much more critical in a low cost printer when letter quality printing is desired. Such a low cost printer typically has a rail and belt drive system. In such a system, the coupling between the driving motor and the print head is not rigid with the result that there is insufficient mechanical damping which causes positional error between the motor and the print head. Undershoot and overshoot conditions will continually occur as the print head assembly attempts to get into phase with the driving motor. Another problem that can arise in such a low cost printer system is that the printer may be operating near the resonant frequency of the system. As is well known, this also contributes to system instability and hence compounds the undershoot and overshoot problems.

Two known methods of driving a print carrier assembly are first a constant velocity move, and second, a ramp velocity move. In a constant velocity move system, a velocity command of a constant amplitude over a fixed duration is provided to the print carrier assembly. In a ramped velocity move system, a ramped or triangular shaped velocity command is applied to the print carrier assembly. A major problem with both of these types of systems is that the print carrier response does not match the command velocity signal. As a result, undershoot and overshoot of the print carrier assembly will occur. This leads to print character misregistration and hence a decrease in print quality. With either of these two types of systems, some feedback sensing is required in order to provide letter quality printing in such a low cost printer.

DISCLOSURE OF THE INVENTION

It is a principal object of the invention to provide an improved method and apparatus for driving a print carrier assembly.

It is another object of this invention to provide a method and apparatus for minimizing undershoot and overshoot of a print carrier assembly in a printer.

It is a further object of this invention to provide a method and apparatus for enabling letter quality printing in a low cost printer.

It is still another object of this invention to provide a method and apparatus for driving a print carrier assembly wherein undershoot and overshoot of the assembly is minimized without the use of a feedback sensor between the print carrier assembly and the print carrier driving apparatus.

These and other objects are accomplished by matching the escapement move sequence to the dynamic characteristics of the printer, namely the damped natural frequency and the damping ratio of the primary error mode between the print carrier and the driving motor. Three sequential constant velocity commands are applied to the print carrier assembly each time a printing operation is required. The amplitude and duration of the constant velocity commands are chosen such that there is zero position and velocity error of the print carrier assembly with respect to the driving motor at the beginning of the second and the conclusion of the third velocity commands. The duration of both the first and third velocity commands are integer multiples of the printer system damped natural half period. The amplitudes of the first and third velocity commands are adjusted relative to the amplitude of the second in order to obtain zero velocity error at the beginning of the second and the conclusion of the third velocity commands.

The amplitude of the second velocity command is set to exactly match the response velocity of the print carrier assembly at the conclusion of the first command velocity. The third command velocity is chosen so as to produce a zero response velocity of the print carrier assembly at the conclusion of the third velocity command. The relative amplitudes of the first and third velocity commands are dependent upon the system damping ratio. Since the tracking error between the print carrier and the input commands is zero during the time that the second velocity command is applied, the duration of the second velocity command is inconsequential. As a result, the duration of the second velocity command can be adjusted for a variety of move sizes while retaining the first and third velocity commands.

BEST MODE FOR CARRYING OUT THE INVENTION

The mechanical features of a print stopped printer are well known in the art. Since they do not form a part of this invention, such mechanical features will not be described in detail herein. They will be described only to the extent necessary to explain the operation of the escapement control system.

Figure 1:
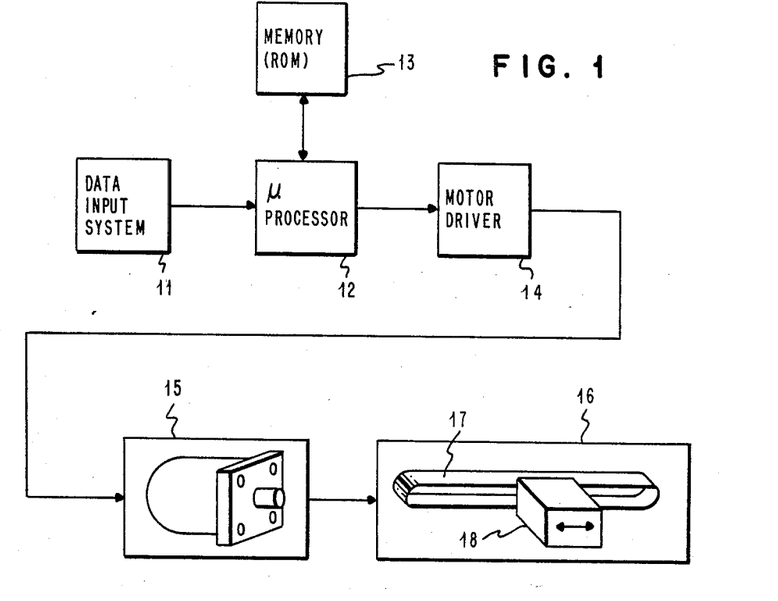
FIG. 1 is an overall system diagram.

Referring now to FIG. 1, the escapement control system includes a microprocessor unit 12 which is used to control the operation of motor driver 14. The microprocessor unit 12 is a standard, well known product such as the INTEL 8051 microprocessor. Data is input to microprocessor 12 via a data input system 11. Data input system 11 provides not only the characters to be printed but also control information in the form of escapement distance and direction. The format in which data is transmitted from data input system 11 to microprocessor 12 does not form a part of the present invention and will not be discussed further herein.

Memory 13, which is a read only memory (ROM) stores an operating program for microprocessor 12. It is microprocessor 12 in conjunction with memory 13 which provides the velocity commands to motor driver 14 for driving step motor 15 so as to position print head 18 at the next desired print position. As shown in FIG. 1, print carrier assembly 16 comprises print head 18 and belt 17 for positioning head 18 in response to the movement of stepper motor 15.

In operation, data as well as control information is input to microprocessor 12 from data input system 11. The control information includes escapement data, i.e., how far and in which direction the print head 18 must be moved before the next print operation takes place. This information is processed by microprocessor 12 which outputs a sequence of sequential velocity commands to motor driver 14. These sequential velocity commands are converted into step commands for driving stepping motor 15. The step commands input to stepping motor 15 are such as to provide the required acceleration and deceleration of print head 18 to its next print position. The sum of the number of steps taken by motor 15 is equal to the escapement distance that print head 18 must travel.

A key element of the present invention is the determination of the duration and amplitude of the sequential velocity commands outputted by microprocessor 12 to motor driver 14. The duration and amplitude of these commands will depend not only upon the escapement distance required, but will also depend on the dynamic characteristics of the printing system. In particular, such information depends upon the undamped natural frequency of the printing system as well as the damping ratio of the printing system. The determination of an optimal set of velocity commands will now be described in detail.

Figure 2:
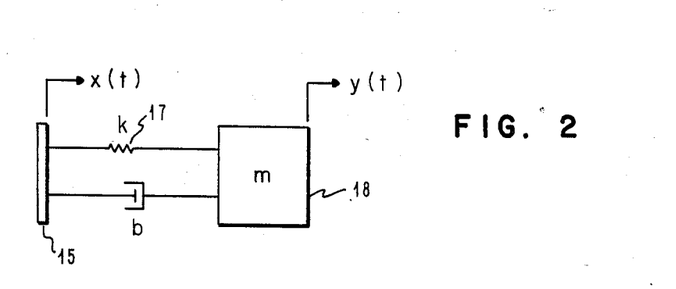
FIG. 2 is a single degree of freedom model showing the relationship between the print carrier assembly and the driving motor.

A single degree of freedom model as shown in FIG. 2 adequately describes the response of print head 18 with respect to stepping motor 15. $X(t)$ is the input displacement, i.e., the movement of step motor 15 in response to motor driver 14, and $Y(t)$ is the output displacement, i.e., the response of print head 18 to the input displacement from stepping motor 15 via belt 19. The mass of print head 18 is represented by m while the equivalent print head 18/motor 15 stiffness is represented by element k. The equivalent print head 18/motor 15 viscous damping coefficient is represented by element b. The undamped natural frequency of the model shown in FIG. 2 is represented by $$\omega_n = \sqrt{k/m} \ .$$

The damped natural frequency, $\omega_d$, is equal to $$\omega_n \sqrt{1 - \xi^2} \ ,$$

where $\xi$ is the damping ratio.

In addition to assuming that a single degree of freedom model adequately describes the response of print head 18, it is also assumed that the displacement input to print head 18 is a series of ramp functions. Both of these assumptions are valid if the fundamental frequencies of print head 18 and motor 15 are well separated. As a result, the dynamic response characteristics of print head 18 do not appreciably affect the response of motor 15, and a synchronous movement of motor 15, which has a sufficient number of steps, appears as a ramp displacement input to print head 18.

Figure 3:
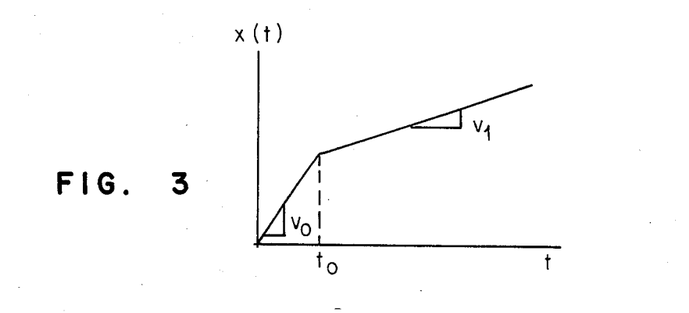
FIG. 3 is a general displacement input profile of a series of synchronous motor moves.

A general input displacement profile is shown in FIG. 3. Such a profile results from a series of synchronous moves of motor 15. The input displacement for time less than $t_0$ can be represented as phase 1 with a velocity command of $V_0$, and the input displacement for time greater than $t_0$ can be represented by phase 2 with a velocity command of $V_1$. If the carrier positional error E is defined as the difference between the carrier response $Y(t)$ and the input displacement $X(t)$, the normalized position error response for phase 2 is given by $$\frac{E(\tau)}{V_0 t_0} = \eta(\tau) = -(\lambda - 1)\left(\frac{\omega_n}{\omega_d}\right) e^{-\xi(\frac{\omega_n}{\omega_d})(\omega_d t_0)(\tau-1)} \times \quad (1a)$$

$$\sin[(\omega_d t_0)(\tau - 1) - \phi] + \left\{ \frac{1}{(\omega_d t_0)}\left[\Psi - \frac{V_1}{V_0}\right] + \right.$$

$$\left. 2\xi\left(\frac{\omega_n}{\omega_d}\right)(\lambda - 1) \right\} \times e^{-\xi(\frac{\omega_n}{\omega_d})(\omega_d t_0)(\tau-1)} \sin[(\omega_d t_0)(\tau - 1)]$$

where $\tau$ is the normalized time represented by $t/t_0$, and $$\phi = \tan^{-1} \sqrt{\frac{1 - \xi^2}{\xi^2}} \ .$$

$X_0$, $Y_0$, and $V_{y0}$ represent, respectively, at time 0, the input 15 and print head 18 initial positions, and the print head initial velocity. Note that equation (1a) is valid for $\tau$ greater than 1, i.e., for $t > t_0$.

The constants $\lambda$ and $\Psi$ are the normalized initial conditions for the beginning of phase 2, i.e., $\lambda = (Y(\tau)/V_0 t_0)|_{\tau=1}$, and $\Psi = (Y(\tau)/V_0)|_{\tau=1}.$ These constants are given by $$\lambda = 1 + \frac{\left[\left(\frac{V_{y0}}{V_0}\right) - 1\right]}{(\omega_d t_0)} e^{-\xi(\frac{\omega_n}{\omega_d})(\omega_d t_0)} \sin(\omega_d t_0) \quad (1b)$$

$$\Psi = 1 + \left[\left(\frac{V_{y0}}{V_0}\right) - 1\right] e^{-\xi(\frac{\omega_n}{\omega_d})(\omega_d t_0)} \left[\cos(\omega_d t_0) - \xi\left(\frac{\omega_n}{\omega_d}\right) \sin(\omega_d t_0)\right]. \quad (1c)$$

Equation (1a) suggests that the normalized error response $\eta(\tau)$ can be maintained at zero for $\tau$ greater than one from any quiescent initial condition. This means that print head 18 can be accelerated to a zero tracking error condition with two sequential ramp inputs, and also can later be decelerated to a zero tracking error condition with two additional sequential ramp inputs. Such zero tracking error conditions can be accomplished by concurrently zeroing the damped sinusoid coefficients in Equation (1a). This implies that $$\lambda = 1 \text{ and} \quad (2)$$

$$\Psi = V_1/V_0. \quad (3)$$

In order for Equations 2 and 3 to be true, then $$\omega_d t_0 = n\pi, \text{ where } n = 1, 2, 3, \ldots \text{ and} \quad (4)$$

$$\frac{V_1}{V_0} = 1 + (-1)^n \left[\left(\frac{V_{y0}}{V_0}\right) - 1\right] e^{-\xi(\frac{\omega_n}{\omega_d})n\pi}. \quad (5)$$

Equation (4) states that the duration of acceleration and deceleration regions of the input velocity command profile must each be an integer multiple of the damped natural half period. Equation (5) describes the profile velocity ratios that must exist for a zero tracking error to occur. Note that $V_0$ is the velocity at a time less than $t_0$ and $V_1$ is the velocity for time greater than $t_0$ as shown in FIG. 3.

Figure 4:
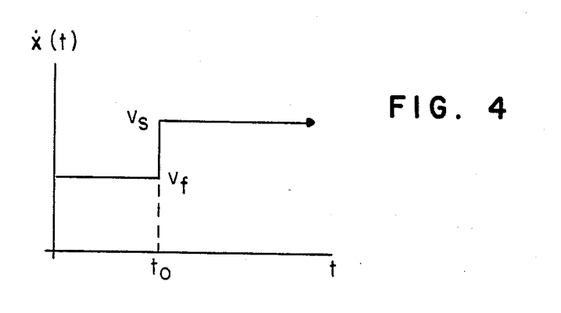
FIG. 4 is an optimal acceleration profile for a print carrier assembly using two ramp inputs.

As an example, assume that print head 18 is accelerated to a constant velocity, with two ramp inputs as shown in FIG. 4. $V_f$ is the acceleration velocity. $V_s$ is the slew velocity and represents that velocity which is applied to print head 18 after the acceleration velocity to maintain the velocity of print head 18 at a constant value. For a one character movement of print head 18, the duration of slew velocity, $V_s$, will be quite short. For the movement of print head 18 over a great distance, such as for example, during a tab operation, the duration of slew velocity, $V_s$, could be quite long. The time $t_0$ represents the length of time that print head 18 is accelerating, that is, the duration of the acceleration velocity. Designating alpha, $\alpha$, as the optimum ratio of acceleration velocity to slew velocity that will yield zero positional error for times greater than $t_0$, and with an initial condition of $V_0$ equal to 0, yields $$\alpha = \frac{1}{1 - (-1)^n e^{-\xi(\frac{\omega_n}{\omega_d})n\pi}}. \quad (6)$$

Figure 5:
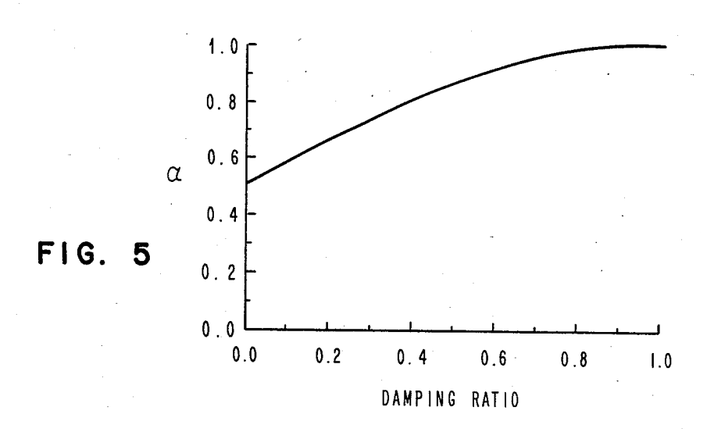
FIG. 5 is a plot of optimum acceleration velocity ratio as a function of system damping ratio.

A plot of $\alpha$ as a function of damping ratio for $n=1$ is shown in FIG. 5.

Figure 6:
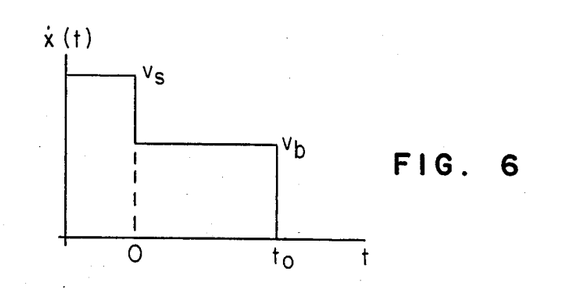
FIG. 6 is an optimal deceleration profile using two ramp inputs.

Print head 18 can now be decelerated from a constant slew velocity to zero velocity with two ramp inputs as shown in FIG. 6. $V_s$ as previously explained is the slew velocity while $V_b$ is the deceleration velocity. The time $t_0$ represents the duration of the deceleration velocity. Designating beta, $\beta$, as the optimum ratio of deceleration velocity to slew velocity that will yield zero tracking error for times greater than $t_0$, and with an initial condition of $V_{y0} = V_s$, yields $$\beta = \frac{1}{1 - (-1)^n e^{\xi(\frac{\omega_n}{\omega_d})n\pi}}. \quad (7)$$

Figure 7:
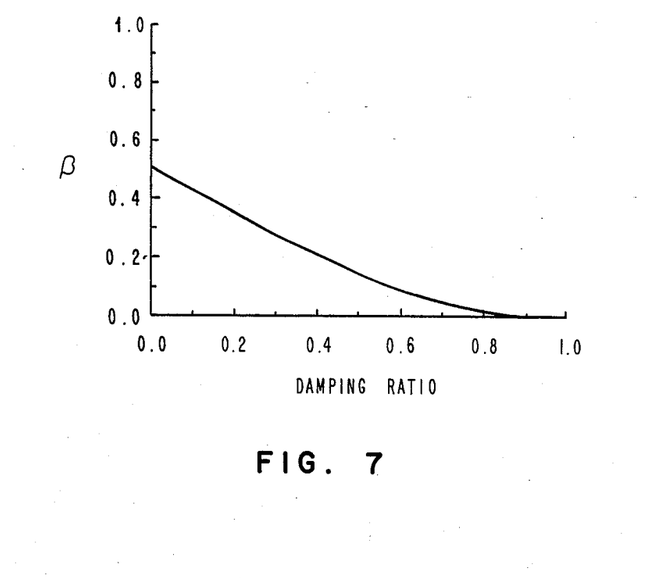
FIG. 7 is a plot of optimum deceleration velocity ratio as a function of system damping ratio.

A plot of beta as a function of damping ratio is shown in FIG. 7.

Figure 8:
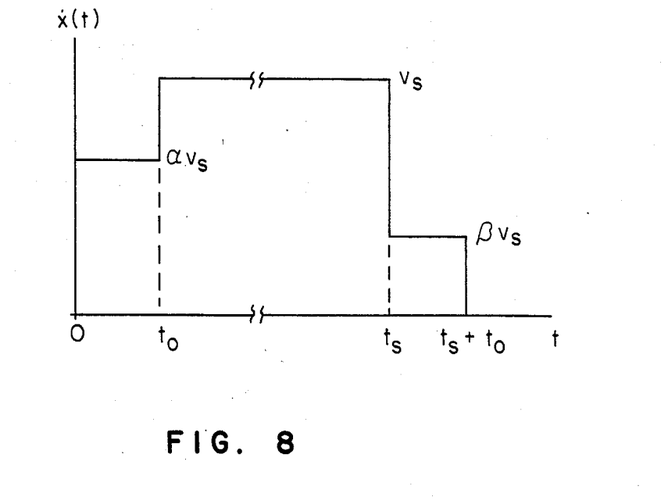
FIG. 8 is an optimal matched move velocity profile.
Figure 9:
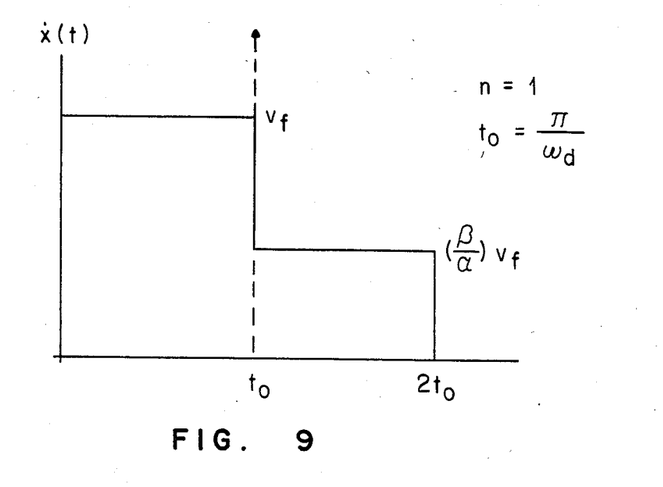
FIG. 9 is a optimal matched move velocity profile with a zero slew duration.
Figure 10:
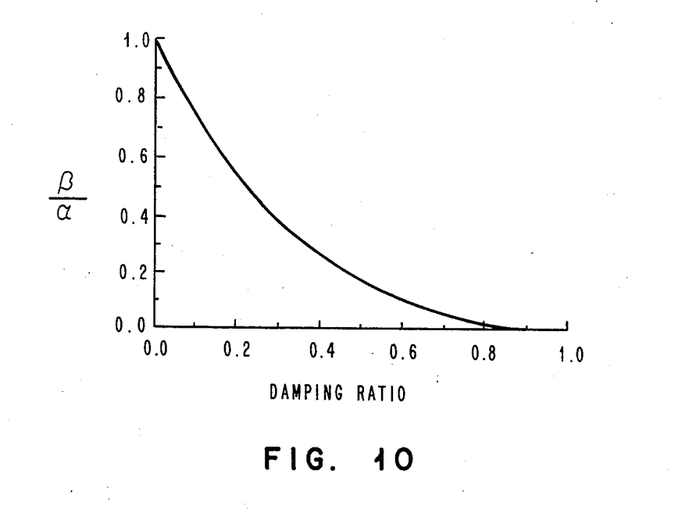
FIG. 10 is a plot of optimum deceleration to acceleration velocity ratio as a function of system damping ratio.

Combining FIGS. 4 and 6 yields an optimal velocity profile as shown in FIG. 8. As previously stated, the duration of the slew velocity $V_s$, that is, the time from $t_0$ to $t_s$ is totally dependent upon the length of move that print head 18 is required to make. For a tab movement of print head 18, the duration of $V_s$ will be very much greater than that for a movement of only a few characters in length. In fact, for a movement of only a single character, the duration of the slew velocity can collapse to zero. The resulting profile for such a zero length slew velocity is shown in FIG. 9. A plot of the optimal deceleration to acceleration velocity ratio, i.e., the ratio of beta to alpha, as a function of damping ratio is shown in FIG. 10.

Having derived an optimum velocity profile for the single degree of freedom model shown in FIG. 2, it remains to determine the optimal velocity profile for a discrete step system. Such a discrete step system is shown in FIG. 1 where stepping motor 15 drives belt 19 so as to advance print head 18 to the desired print location. The number of acceleration steps, deceleration steps, and slew steps are defined as $N_f$, $N_b$, and $N_s$, respectively. The acceleration, deceleration, and slew velocities are defined by $V_f$, $V_b$, and $V_s$, respectively. As indicated previously, the duration of the acceleration and deceleration regions must be one half of the damped natural period, (for $n=1$) that is, $$t_0 = \pi/\omega_d. \quad (8)$$

Additionally, $$N_f D_f = t_0 \text{ and} \quad (9)$$

$$N_b D_b = t_0 \quad (10)$$

where $D_f$ and $D_b$ are the acceleration and deceleration step durations, respectively. Note that the velocities are simply the reciprocals of the step durations.

For an optimum velocity profile, that is, one with zero tracking error, $$V_f/V_b = \alpha/\beta \quad (11)$$

which implies that $$\frac{N_f}{N_b} = \frac{\alpha}{\beta} \tag{12}$$

which is analogous to $$\frac{D_b}{D_f} = \frac{\alpha}{\beta} \tag{13}$$

Note that it is very difficult to satisfy Equation (12) because the number of acceleration and deceleration steps must be discrete and both $\alpha$ and $\beta$ are continuous functions. However, if equation 12 is not satisfied exactly, then the slew velocity cannot be matched for both the acceleration and deceleration regions. One way to overcome this problem is to set the slew velocity equal to the average of the velocities required to optimally match the acceleration and deceleration velocities, that is, $$V_s = \tfrac{1}{2}\left(\frac{N_f}{\alpha t_0} + \frac{N_b}{\beta t_0}\right). \tag{14}$$

A table can then be generated using equation 14 for a given system having a known damping ratio and undamped natural frequency. Once such a table has been generated, there are three factors to be considered in choosing a discrete optimal velocity profile. The first factor is the time required to complete a specific move sequence. The throughput capability of a printer determines the maximum move time. The second factor to be considered is the step coarseness, that is, the number of steps generated by step motor 15. It is desirable to have a sufficient number of steps on both the acceleration and deceleration of the velocity profile so that these displacement inputs to print head 18 will more closely resemble ramps and thus be closer to the derived model. The third factor to be considered is that step velocity changes that occur at the beginning and end of the slew segment must be within the torque capabilities of stepping motor 15. Once a discrete optimum velocity profile has been selected, it can be used for a variety of move sizes simply by changing the number of slew steps in the move while keeping the duration of the acceleration and deceleration regions intact.

Figure 11A:
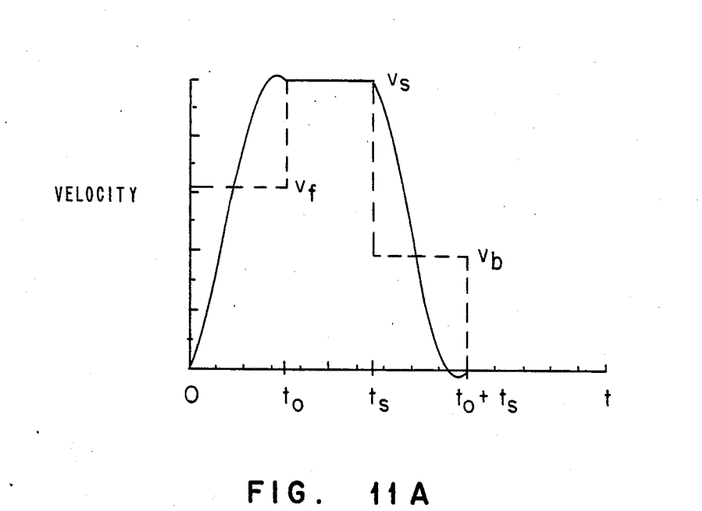
FIGS. 11A and 11B are plots of velocity and displacement for a computer simulation using the optimal velocity profile of the present invention.

The velocity response of print head 18 to the optimal three sequential velocity command profile is shown in FIG. 11A. The input velocity commands are shown in dashed lines while the velocity response of print head 18 is shown in solid lines. As can be seen, there is zero velocity error at the conclusion of the first and third sequential velocity commands. At time $t_0$, the velocity of print head 18 is equal to the velocity of the second of the three sequential velocity commands, i.e., the velocity of print head 18 is equal to the slew velocity, $V_s$. Also, at the conclusion of the third sequential velocity command, i.e., at time, $t_s+t_0$, the velocity of print head 18 is equal to zero signifying that print head 18 has come to a stop.

Figure 11B:
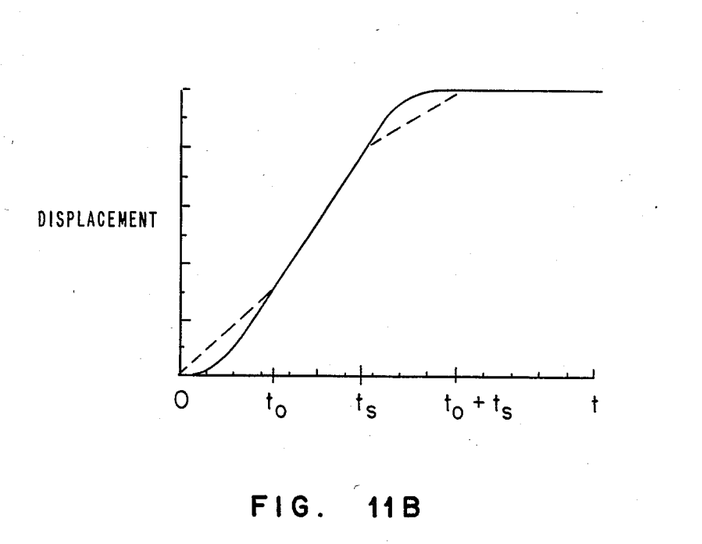

The displacement of print head 18 (solid lines) in response to the movement of step motor 15 (dashed lines) is shown in FIG. 11B. Once again, it can be seen that there is zero position error for $t_0 \leq t \leq t_s$ and for $t \geq t_0 + t_s$.

As previously described herein, in order for the positional or displacement error to be zero for times $t_0 \leq t \leq t_s$ and $t \geq t_0 + t_s$, the duration of the first and third velocity commands must be an integer multiple of the system damped natural half-period. As indicated in Equation (8), for the first order system described herein, the duration $t_0$ must be equal to one half of the damped natural period.

The amplitudes of the velocity commands are adjusted to obtain zero velocity error at the original transition times, i.e., at $t_0$ and $t_0+t_s$. The amplitude of the command slew velocity, $V_s$, is set to exactly match the response velocity of print head 18 at time $t_0$. Likewise the deceleration command velocity, $V_b$, is set so as to produce a zero response velocity of print head 18 at time $t_0+t_s$. As previously described in Equation (5), the relative amplitudes of $V_s$ and $V_b$ at the critical times depend upon the system damping ratio $\epsilon$.

Figure 12:
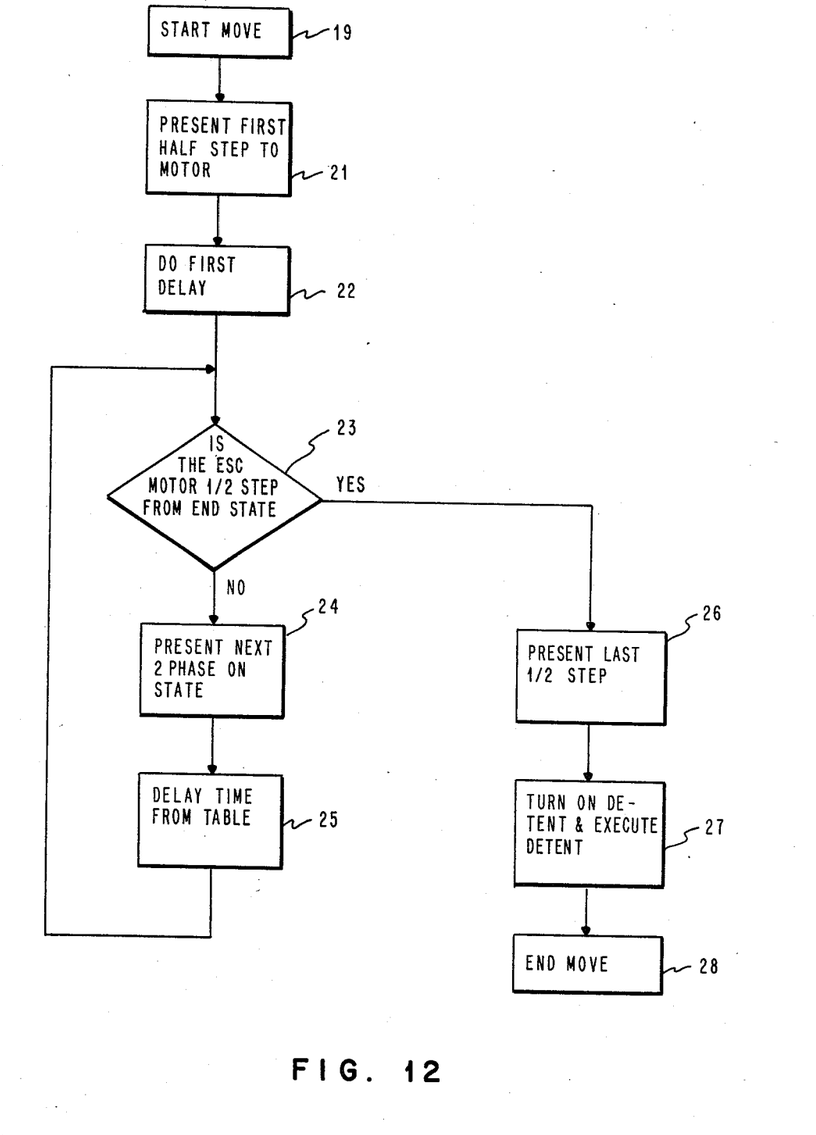
FIG. 12 is a flow diagram describing the movement of the print carrier assembly for each printing operation.

FIG. 12 illustrates the overall sequence of operation of the escapement control system shown in FIG. 1. In block 19, information as to the move direction, size, and steps are provided to motor driver 14. At this time, an escapement move sequence is about to begin. In block 21, motor driver 14 switches on motor 15. In block 22, motor 15 is beginning to physically respond to the signal provided from motor driver 14 as torque is provided to drive belt 17 and print head 18. The length of time that a drive signal is provided to motor 15 depends on the total escapement distance that print head 18 must travel. Typically, when using a step motor to drive a print carrier, a table is generated providing the length of time that the stepper motor is to be driven as a function of the total step size. Additionally, the total driving time is usually broken up into a sequence of individual driving times which total the length of time required to drive the print carrier the required distance.

As an example, a ten step escapement move may be accomplished using 10 individual driving sequences. Block 22 represents the length of time that motor 15 is driven as a result of the first sequence. At the conclusion of this first sequence, decision block 23 is reached. Since there are nine more individual sequences through which motor 15 must be driven, operation control branches to block 24 which continues the driving of motor 14 for a length of time determined in block 25. In this case block 25 provides a signal corresponding to the second time sequence for a ten step move. As the conclusion of this second sequence decision block 23 is queried once more. Once again motor 15 continues to be driven for a length of time determined by the third time sequence for a ten step move. This iterative procedure continues until the last of ten sequences for a ten character move is completed.

At this time, operation control branches to block 26 which causes motor 15 to begin to turn off thereby bringing print head 18 to a stop. In blocks 27 and 28 a detent operation is executed which causes print head 18 to print the next character.

For an escapement move of sufficient length, the individual time sequences during which stepper motor 15 is driven may be broken up into three distinct sections. The first section is the acceleration section; the second section is the slew section; and, the third section is the deceleration section. During the acceleration section, the signals provided to motor 15 are such as to provide a constant velocity signal to print head 18 so as to accelerate print head 18 from a stopped position to a constant velocity. During the slew section, time sequences are provided to motor 15 so as to maintain print head 18 at such constant velocity. Finally, during the deceleration section, signals are provided to motor 15 so as to decelerate print head 18 to a stopped position. The acceleration, slew and deceleration sections correspond to the acceleration, slew and deceleration regions previously discussed and as shown in FIG. 8.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A system for controlling escapement of a print carrier, comprising:
   means for converting escapement data into a plurality of sequential velocity commands, the duration of which are dependent upon the damped natural frequency of the system;
   means for driving said print carrier in response to the application of said plurality of sequential velocity commands thereto over the entire length of escapement distance, thereby substantially eliminating velocity and positional error of said print carrier at the conclusion of the last of said plurality of sequential velocity commands; and
   wherein said plurality of sequential velocity commands comprises an acceleration velocity command, a deceleration velocity command and a slew velocity command interposed therebetween, the durations of the acceleration velocity command and the deceleration velocity command being substantially equal to one half of the damped natural period of the system.

2. A system according to claim 1 wherein the ratio, $\alpha$, of the amplitude of the acceleration velocity command to the amplitude of the slew velocity command is substantially given by $$\alpha = \frac{V_f}{V_s} = \frac{1}{1 - (-1)^n e^{-\xi(\frac{\omega_n}{\omega_d})n\pi}}.$$

wherein $V_f$ and $V_s$ are the amplitudes of the acceleration and slew velocity commands, respectively, n is an integer, $\omega_n$ and $\omega_d$ are the undamped and damped natural frequencies of the system, respectively, and wherein $\xi$ is the damping ratio of the system.

3. A system according to claim 2 wherein the ratio, $\beta$, of the amplitude of the deceleration velocity command to the amplitude of the slew velocity command is given by $$\beta = \frac{V_b}{V_s} = \frac{1}{1 - (-1)^n e^{\xi(\frac{\omega_n}{\omega_d})n\pi}},$$

wherein $V_b$ and $V_s$ are the amplitudes of the deceleration and slew velocity commands, respectively, n is an integer, $\omega_n$ and $\omega_d$ are the undamped and damped natural freqencies of the system, respectively, and wherein $\xi$ is the damping ratio of the system.

4. A system for controlling escapement of a print carrier comprising:
   means for converting escapement data into a plurality of sequential velocity commands the duration of which are dependent upon the damped natural frequency of the system;
   means for generating a plurality of step commands from said plurality of sequential velocity commands;
   means for driving said print carrier in stepwise increments in response to the application of said plurality of step commands thereto over the entire length of escapement distance, thereby substantially eliminating velocity and positional error of said print carrier at the conclusion of the last of the plurality of step commands; and
   wherein said plurality of sequential velocity commands comprises an acceleration velocity command, a deceleration velocity command, and a slew velocity command interposed therebetween, the durations of the acceleration velocity command and the deceleration velocity command being substantially equal to one-half of the damped natural period of the system.

5. A system according to claim 4 wherein said means for driving comprises a stepper motor, the natural frequency of said stepper motor being much greater than the natural frequency of said print carrier.

6. A system according to claim 4 wherein the ratio, $\alpha$, of the amplitude of the acceleration velocity command to the slew velocity command is substantially given by $$\alpha = \frac{V_f}{V_s} = \frac{1}{1 - (-1)^n e^{-\xi(\frac{\omega_n}{\omega_d})n\pi}}.$$

wherein $V_f$ and $V_s$ are the amplitudes of the acceleration and slew velocity commands, respectively, n is an integer, $\omega_n$ and $\omega_d$ are the undamped and damped natural frequencies of the system, respectively, and wherein $\xi$ is the damping ratio of the system.

7. A system according to claim 6 wherein the ratio, $\beta$, of the amplitude of the deceleration velocity command to the slew velocity command is substantially given by $$\beta = \frac{V_b}{V_s} = \frac{1}{1 - (-1)^n e^{\xi(\frac{\omega_n}{\omega_d})n\pi}},$$

wherein $V_b$ is the amplitude of the deceleration velocity command.

8. A system according to claim 7 wherein the amplitude of said slew velocity command, is substantially given by $$V_s = \tfrac{1}{2}\left(\frac{N_f}{\alpha t_0} + \frac{N_b}{\beta t_0}\right),$$

wherein $N_f$ and $N_b$ are the number of steps in the acceleration and deceleration velocity commands, respectively, and wherein $t_0$ is the duration of the acceleration and deceleration velocity commands.

9. A method for controlling escapement of a print carrier, in a print system, comprising:
   accelerating said printer carrier, over a time period substantially equal to one-half of the damped natural period of said print system by applying a substantially constant velocity signal to said print carrier, the velocity of said print carrier being substantially equal to said signal at the conclusion of said time period;

maintaining said print carrier at said substantially constant velocity for a length of time dependent on the escapement distance; and decelerating said print carrier from said substantially constant velocity to a substantially stopped position over a time period substantially equal to one-half of the damped natural period of said print system.

10. A method according to claim 9 wherein the step of maintaining said print carrier at said substantially constant velocity comprises, applying a second substantially constant velocity signal to said print carrier, the amplitude of said second substantially constant velocity signal being nearly equal to the amplitude of said substantially constant velocity.

11. A method according to claim 10 wherein the step of decelerating said print carrier comprises, the step of applying a third substantially constant velocity signal to said print carrier, wherein the ratio of the amplitude of said third substantially constant velocity signal to the amplitude of said second substantially constant velocity signal is given by $$\frac{1}{1 + e^{\xi(\frac{\omega_n}{\omega_d})\pi}},$$

wherein $\omega_n$ and $\omega_d$ are the undamped and damped natural frequencies of the print system and wherein $\xi$ is the damping ratio of the print system.

12. A system for controlling escapement of a print carrier, comprising:

means for converting escapement data into a plurality of sequential velocity commands, including an acceleration velocity command, a deceleration velocity command, and a slew velocity command interposed therebetween, the duration of said sequential velocity commands being dependent upon the damped natural frequency of the system, the ratio, $\alpha$, of the amplitude of the acceleration velocity command to the amplitude of the slew velocity command being substantially given by $$\alpha = \frac{V_f}{V_s} = \frac{1}{1 - (-1)^n e^{-\xi(\frac{\omega_n}{\omega_d})n\pi}}.$$

wherein $V_f$ and $V_s$ are the amplitudes of the acceleration and slew velocity commands, respectively, n is an integer, $\omega_n$ and $\omega_d$ are the undamped and damped natural frequencies of the system, respectively, and wherein $\xi$ is the damping ratio of the system; and, means for driving said print carrier in response to the application of said plurality of sequential velocity commands thereto.

13. A system for controlling escapement of a print carrier, comprising:

means for converting escapement data into a plurality of sequential velocity commands, including an acceleration velocity command, a deceleration velocity command, and a slew velocity command interposed therebetween, the duration of said sequential velocity commands being dependent upon the damped natural frequency of the system, the ratio, $\beta$, of the amplitude of the deceleration velocity command to the amplitude of the slew velocity command being given by $$\beta = \frac{V_b}{V_s} = \frac{1}{1 - (-1)^n e^{\xi(\frac{\omega_n}{\omega_d})n\pi}},$$

wherein $V_b$ and $V_s$ are the amplitudes of the deceleration and slew velocity commands, respectively, n is an integer, $\omega_n$ and $\omega_d$ are the undamped and damped natural frequencies of the system, respectively, and wherein $\xi$ is the damping ratio of the system.

14. A system for controlling escapement of a print carrier comprising:

means for converting escapement data into a plurality of sequential velocity commands, including an acceleration velocity command, a deceleration velocity command, and a slew velocity command interposed therebetween, the duration of said sequential velocity commands being dependent upon the damped natural frequency of the system, the ratio, $\alpha$, of the amplitude of the acceleration velocity command to the slew velocity command being substantially given by $$\alpha = \frac{V_f}{V_s} = \frac{1}{1 - (-1)^n e^{-\xi(\frac{\omega_n}{\omega_d})n\pi}}.$$

wherein $V_f$ and $V_s$ are the amplitudes of the acceleration and slew velocity commands, respectively, n is an integer, $\omega_n$ and $\omega_d$ are the undamped and damped natural frequencies of the system, respectively, and wherein $\xi$ is the damping ratio of the system.

15. A system according to claim 14 wherein the ratio, $\beta$, of the amplitude of the deceleration velocity command to the slew velocity command is substantially given by $$\beta = \frac{V_b}{V_s} = \frac{1}{1 - (-1)^n e^{\xi(\frac{\omega_n}{\omega_d})n\pi}},$$

wherein $V_b$ is the amplitude of the deceleration velocity command.

16. A system according to claim 15 wherein the amplitude of said slew velocity command, is substantially given by $$V_s = \frac{1}{2}\left(\frac{N_f}{\alpha t_0} + \frac{N_b}{\beta t_0}\right),$$

wherein $N_f$ and $N_b$ are the number of steps in the acceleration and deceleration velocity commands, respectively, and wherein $t_0$ is the duration of the acceleration and deceleration velocity commands.

* * * * *

UNITED STATES PATENT AND TRADEMARK OFFICE
CERTIFICATE OF CORRECTION

PATENT NO. : 4,589,790
DATED : May 20, 1986
INVENTOR(S) : J. S. Corbin, Jr. et al It is certified that error appears in the above—identified patent and that said Letters Patent is hereby corrected as shown below:

Column 5, line 1, "$\Psi=(Y(\tau)/V_0)|\tau=1.$" should read --$\Psi=(\dot{Y}(\tau)/V_0)|\tau=1.$--.

Column 8, line 15, "$\epsilon$" should read --$\xi$--.

Signed and Sealed this

Eighteenth Day of November, 1986

*Attest:*

DONALD J. QUIGG

*Attesting Officer*     *Commissioner of Patents and Trademarks*